June 25, 1940.  A. F. BENNETT ET AL  2,205,462
MACHINE TOOL
Filed Jan. 24, 1938   2 Sheets-Sheet 1

Witness
Charles T. Olson

Inventors
Arthur F. Bennett
George B. Hirsch
by Fred Hildreth
Cary & Jenney Attys

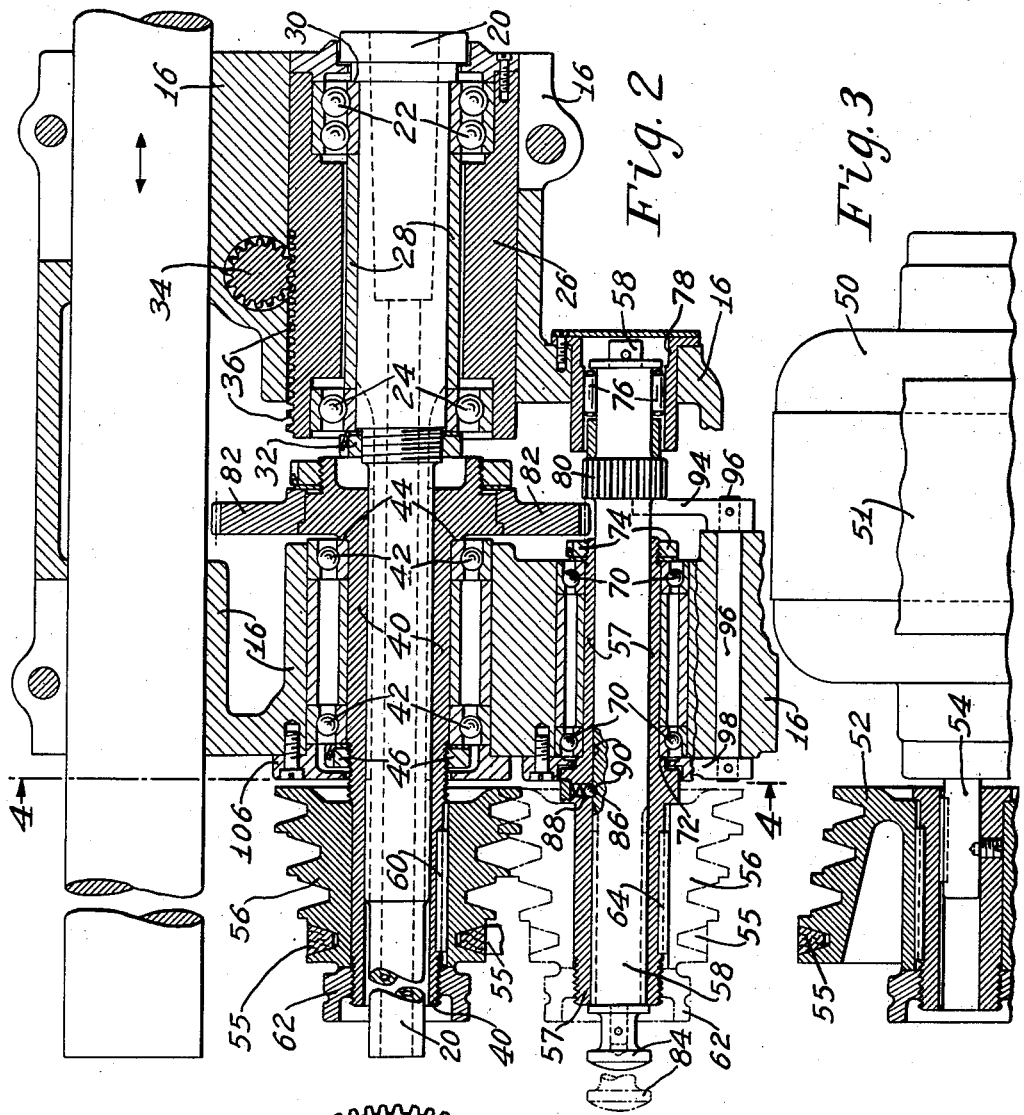

Patented June 25, 1940

2,205,462

UNITED STATES PATENT OFFICE 2,205,462

MACHINE TOOL

Arthur F. Bennett, West Barrington, and George B. Hirsch, Providence, R. I., assignors to Brown and Sharpe Manufacturing Company, a corporation of Rhode Island Application January 24, 1938, Serial No. 186,500

5 Claims. (Cl. 90—18)

The present invention relates to improvements in machine tools, and is herein disclosed as embodied in a cam type milling machine having a longitudinally reciprocable work table and a horizontally disposed rotary milling cutter spindle which is mounted on a spindle support for vertical adjustment toward and away from the table.

It is a principal object of the present invention to simplify and improve the connections for driving the rotary tool spindle in a machine tool, particularly to provide for a rapid and efficient adjustment of these connections in accordance with the requirements of the work.

It is more specifically an object of the invention to provide a novel and improved multiple-speed driving mechanism for a rotary tool spindle of the general type disclosed including a driving pulley, a belt and a driven pulley which can be mounted interchangeably on either of two supporting axes, in the one position being connected to drive the spindle at a fast rate, and in the other position being connected through conventional reduction gearing and clutch connections to drive the spindle at a slow rate, in which means are provided to insure the disengagement of the reduction gearing from the spindle and high speed driving connections thereto when the driven pulley is operatively connected to drive the spindle at the faster rate.

Figure 1:
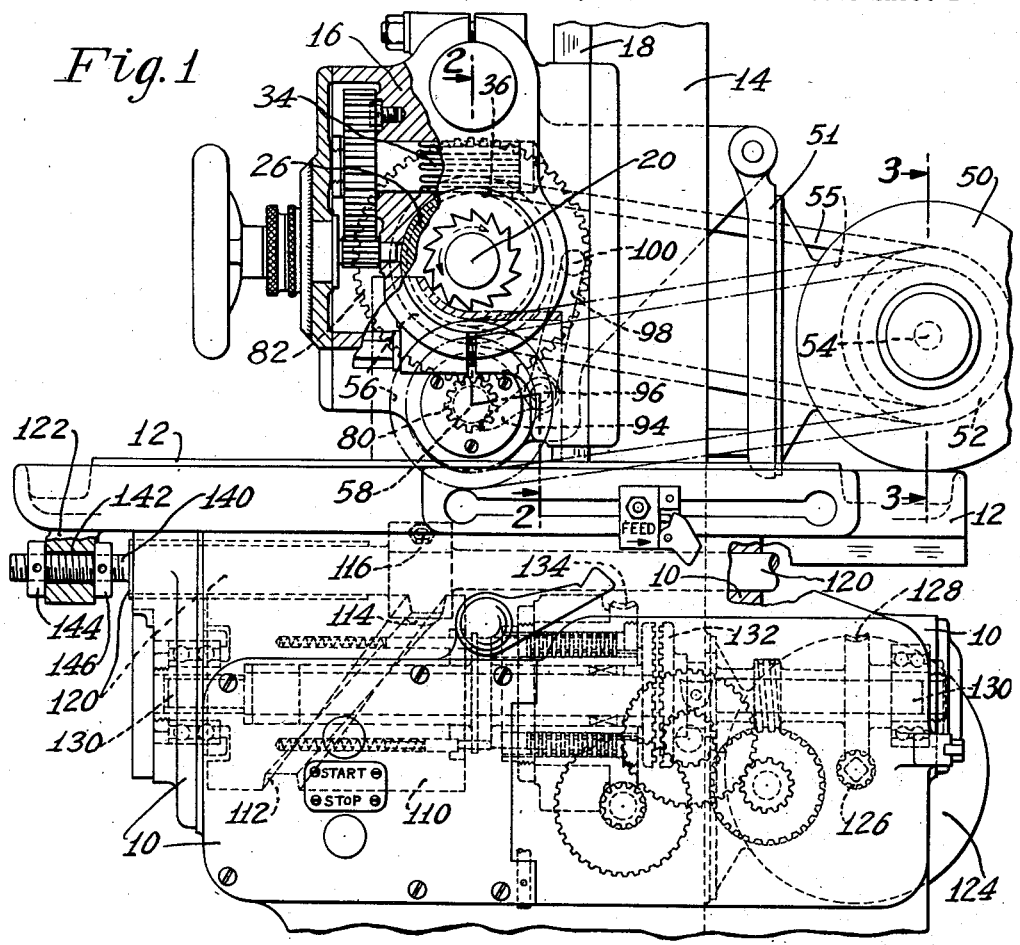
Figure 5:
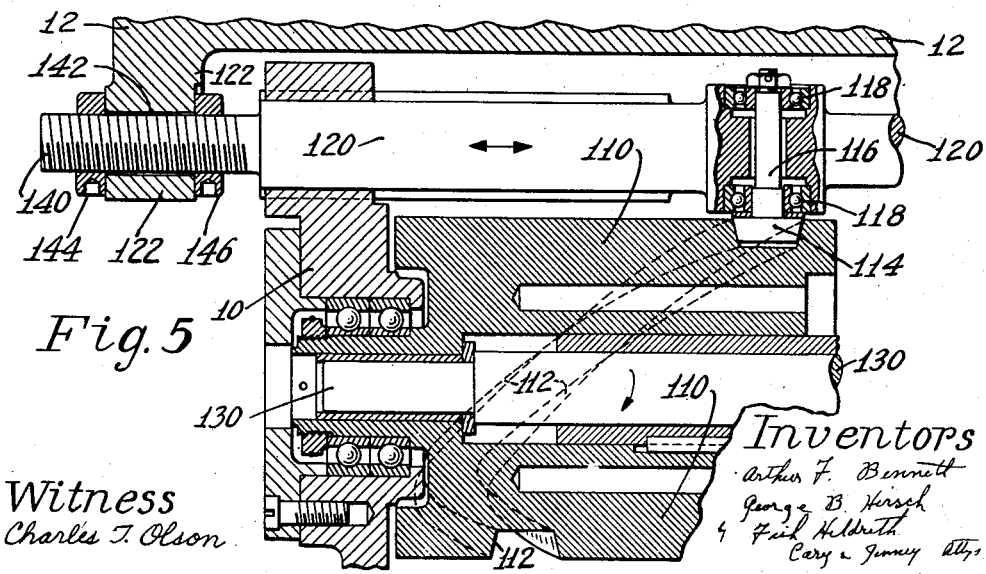

With these and other objects in view, as may hereinafter appear, the several features of the invention consist in the devices, combinations and arrangement of parts hereinafter described and claimed, which together with the advantages to be obtained thereby, will be readily understood by one skilled in the art from the following description taken in connection with the accompanying drawings, in which Fig. 1 is a view in front elevation of a cam type milling machine embodying the several features of applicants' invention, portions of the spindle cutter head having been broken away to show underlying parts, and the table driving connections being generally indicated in dotted lines; Fig. 2 is an enlarged detail view taken on the section line 2—2 of Fig. 1, and illustrating particularly the milling cutter spindle and the high speed and slow speed pulley connections thereto; Fig. 3 is a detail view partly in section taken on the line 3—3 of Fig. 1, to illustrate particularly the driving motor and pulley connection therefrom for driving the cutter spindle; Fig. 4 is a sectional view taken on the line 4—4 of Fig. 2, to illustrate particularly the interlock for controlling the position of the clutching means between the low speed and high speed drive shafts to prevent the driven pulley from being operatively connected to the high speed drive shaft at the same time that the clutch is engaged; and Fig. 5 is an enlarged detail sectional view of the rotatable cam drum and follower connection for reciprocating the work table.

The machine disclosed in the drawings as embodying in a preferred form the several features of applicants' invention, consists of a base 10 having slidably supported thereon a reciprocable work table 12, a vertically extending column 14 forming a rigid unit with the base 10, and a spindle carriage 16 supported in ways 18 on the column 14 for vertical adjustment toward and away from the table 12. The machine is also provided with a rotary milling cutter spindle 20 which is supported to turn on a horizontal axis in bearings carried on the spindle support 16. As best shown in Fig. 2, the spindle 20 is supported at its forward end in bearings 22 and 24 carried in a longitudinally adjustable sleeve support 26. The ball bearings 22 and 24 and a spacing sleeve 28 are inserted between a shoulder 30 and an end thrust bearing nut 32 screw-threaded to the spindle 20, so that the spindle while free to turn within the sleeve support 26, must move axially therewith. Longitudinal adjustment of the sleeve support 26 and spindle 20 may be secured by any conventional means as a pinion 34 meshing with a rack 36 formed in the outer periphery of the sleeve 26.

The cutter spindle 20 is driven by means of a driving sleeve member 40 which is splined onto a reduced rear portion of the spindle 20, and is externally supported in roller bearings generally indicated at 42 in Fig. 2. In order that the sleeve 40 may be rigidly supported against axial movement, the bearings 42 are inserted between a shoulder 44 and an end thrust bearing nut 46 screw-threaded to the sleeve 40.

With the construction herein disclosed, the spindle 20 is arranged to be driven alternatively at a high or low speed rate from an electric motor 50 carried on a bracket 51 on the spindle support 16. The drive is taken from the motor 50 by means of a stepped pulley 52 mounted on the rotor shaft 54 of the motor, a v-shaped belt 55, and a reversely stepped pulley 56 which may be supported on the driving sleeve 40, or alternatively on a slow speed driving sleeve member 57 splined on a slow speed drive shaft 58 which is connectible through reduction gearing to drive the spindle 20 at a low speed rate. As shown in Fig. 2 of the drawings, the driven stepped pulley 56 is fitted onto the rear end of the driving sleeve member 40, being connected to turn therewith by means of a key 60, and held in position by means of a lock nut 62. Alternatively, the driven stepped pulley 56 may be fitted onto the low speed driving sleeve member 57 in the dot-and-dash position shown in Fig. 2, being connected to turn therewith by a key 64, and locked in position by the lock nut 62. As best shown in Fig. 1 of the drawings, the high speed drive sleeve 40 and the slow speed driving sleeve 57 are equi-distant from the rotor shaft 54 of the motor 50.

The driving sleeve member 57 is supported to turn in ball bearings 70 which are inserted between a shoulder 72 and an end thrust bearing nut 74 screw-threaded to the sleeve member 57, so that the sleeve member 57 is free to rotate, but is supported against axial movement in the bearings 70. The drive shaft 58 is supported at its right hand forward end as shown in Fig. 2, by means of a roller bearing 76 which is carried within a stationary bearing sleeve member 78 to permit axial and rotational movement of the shaft 58 therein. A pinion 80 formed on the drive shaft 58 is arranged for engagement with a driven gear 82 on the high speed sleeve member 40 for driving the spindle 20 at the relatively slower rate. A manual control knob 84 secured to the rear end of the slow speed drive shaft 58 provides a convenient means for shifting the gear 80 into and out of mesh with the gear 82. A spring-pressed ball detent 86 carried in a radial bore 88 in the slow speed sleeve member 57, is arranged for engagement alternatively with one or the other of two recesses 90 formed in the periphery of the drive shaft 58 to maintain the shaft 58 and gear 80 alternatively in clutching or disengaged position.

In accordance with one feature of the invention, mechanism is provided which is constructed and arranged to prevent the driven stepped pulley 56 from being operatively connected to the high speed driving sleeve member 40 when the slow speed gear connections 80 and 82 are in meshing position, and conversely to prevent the shifting of the slow speed drive shaft 58 and gear 80 into meshing position with the gear 82 after the stepped pulley 56 has been located in driving position upon the high speed driving sleeve 40. The interlock thus provided between the high speed driving connections for the spindle 20 and the slow speed driving connections including the pinion 80, is of considerable importance to prevent the operator in setting up the machine for high speed operation, from inadvertently leaving the low speed driving gearing in mesh which would result in driving the reduction gearing comprised by the gears 80 and 82 at an excessively rapid rate with a resultant increase in the load on the connections during high speed operation of the spindle 20, excessive wear in the low speed driving connections, and possible breakage of parts. Mechanism providing an interlock between these parts, consists in a locking lever 94 which is secured to a rock shaft 96 journalled in the spindle support 16, and arranged for one angular portions of the rock shaft 96 to engage against the face of the pinion 80 to prevent axial movement of the gear 80 with the drive shaft 58 into mesh with the gear 82. Also secured to the rock shaft 96 is an upwardly extending locking lever 98 which is constructed and arranged when the locking lever 94 has been moved out of the path of axial movement of the pinion 80 to move inwardly toward the axis of the driving sleeve member 40 a sufficient distance to prevent the stepped pulley 56 from being moved axially into operative position upon the driving sleeve 40. As best shown in Fig. 4 of the drawings, the locking lever 98 is provided at its upper end with a rearwardly extending knob 100 which acts when the locking lever 98 is moved inwardly toward the axis of the sleeve member 40 to engage behind and to block the movement of the pulley 56 onto the sleeve 40, or alternatively rides on the periphery of the driven pulley 56, thus locking the lever 94 in its inner position against one face of the pinion 80. The locking lever 98 serves also as a hand lever to enable the operator conveniently to shift the interlocking mechanism from one to the other of its operative positions. At its upper end the lever 98 is provided with a recess 102 which is arranged to be engaged by a spring-pressed detent 104 carried on an end plate or bracket 106 for the bearing 42 when the locking levers 94 and 98 are moved to the slow speed driving position.

With the construction shown in the drawings, the work supporting table 12 is driven by means of a cylindrical cam 110 rotatably supported in the machine base 10, and having formed therein a closed feed and return cam track 112 to receive a follower 114 which is connected for axial movement with the table. The follower 114 is formed on the lower end of a pin 116 supported in bearings 118 on a shaft 120 which extends longitudinally in the direction of table movement, and at its left hand end is rigidly secured to a downwardly extending lug 122 on the table 12. The cam drum 110 is driven continuously in one direction to impart a reciprocatory movement to the table 12 through driving connections which include a table motor 124 mounted on the base 10. A worm 126 connected to turn with the armature shaft of the motor 124, drives a worm gear 128 secured to a table drive shaft 130 supported co-axially with the cam drum 110. The cam drum 110 may be driven from the shaft 130 alternatively at a fast or slow rate through driving connections which include a high speed driving clutch member 132 keyed to the drive shaft 130, and a slow speed driving element in the form of a worm gear 134. Inasmuch as these driving connections form specifically no part of the present invention, and are fully illustrated in the copending application of England, filed of even date herewith, now Patent 2,163,595, June 27, 1939, no further description thereof is believed necessary. The above description is believed adequate to indicate the general organization of the driving connections for the table 12 which is driven by the cam drum 110 through a distance which is determined by the contour of the cam track 112, and is always the same.

While it is the usual practice in machines of this type having a cam drive for the work support, to carefully adjust the position of the work on the support with reference to these known limits of table operation, in order to secure the desired operative relationship between the work and the milling cutter, it has been found that under certain conditions as, for example, where a cut is being made against a shoulder in the work, this method of setting up the work is inadequate to secure the required nicety of adjustment in the operating relationship between the cutter and the work for the performance of high grade work.

Further in accordance with the objects of the invention to provide driving connections for the tool spindle and work support susceptible of quick and accurate adjustment in accordance with the requirements of the work, the cam actuated driving connections for the work table of the illustrated machine are constructed and arranged to permit an adjustment in the position of the table 12 with relation to its driving cam 110 which is effective to secure a corresponding adjustment in the limiting position to which the work is moved with relation to the milling cutter during the movement of the table in the direction of feed, without the necessity of relocating the work on the table. To this end, mechanism is provided for adjusting the position of the table 12 with relation to the cam follower 14. As best shown in Figs. 1 and 5, the supporting shaft 120 for the follower 114 is constructed and arranged with a screw-threaded end portion 140 which passes through and is readily slidable within a bore 142 formed in the lug 122, and is held rigidly in position with relation thereto, by means of two lock nuts 144 and 146 screw-threaded to the end portion 140, and arranged for locking engagement with opposite sides of the lug 122. With this construction and arrangement of the operating connection between the follower 114 and table 12, it will be seen that an adjustment in the limit of table movement 112 is readily obtained by backing off one or both of the lock nuts 144 and 146 to produce an axial adjustment of the shaft 120 with relation to the lug 122 and table 12.

Certain features of applicants' invention relating particularly to the supporting and actuating connections for the work table have been made the subject-matter of a divisional application Serial No. 280,510, filed June 22, 1939.

It will be understood that the invention is not limited to the specific embodiment shown, and that various deviations may be made therefrom without departing from the spirit and scope of the appended claims.

What is claimed is:

1. In a machine tool having a rotary tool spindle, a work support, and means for effecting relative translatory movements to the spindle and work support, a variable speed driving mechanism for rotating the spindle including a prime mover, a rotatable driven member connected to be continuously driven from the prime mover, a high speed driving connection for the spindle having a supporting axis on which the driven member is mountable in operative relation to drive the spindle, a slow speed driving connection for the spindle comprising reduction gearing, a supporting axis on which the driven member is alternatively mountable in operative relation to drive the spindle at the slower rate, control means for connecting said reduction gearing to drive the spindle, and an interlocking device constructed and arranged to prevent the mounting of the driven member in operative position on the high speed axis when the reduction gearing is connected to the spindle.

2. In a machine tool having a rotary tool spindle, a work support, and means for effecting relative translatory movements of the spindle and work support, a variable speed driving mechanism for rotating the spindle including a driving pulley, and a driven pulley, a high speed driving connection for the spindle, a slow speed driving connection for the spindle including reduction gearing, and control means for connecting said reduction gearing to drive the spindle, supporting axes associated with each of said driving connections on which the driven pulley is interchangeably mounted to effect the drive alternatively at the high or slow rate, and an interlocking device rendered operative by the connecting of said reduction gearing to the spindle to obstruct the positioning of the driven pulley in operative position on the high speed supporting axis.

3. In a machine tool having a rotary tool spindle, a work support, and means for effecting relative translatory movements of the spindle and work support, a variable speed driving mechanism for rotating the spindle including a driving pulley, and a driven pulley, a high speed driving connection for the spindle, a slow speed driving connection for the spindle including reduction gearing, and control means for connecting said gearing to drive the spindle, supporting axes associated with each of said driving connections on which the driven pulley is interchangeably mounted to effect the drive alternatively at the high or slow rate, and an interlocking device constructed and arranged to prevent the connecting of said reduction gearing to the spindle when the driven pulley is located in operative position on the high speed supporting axis.

4. In a machine tool having a rotary tool spindle and a work support, a two-speed driving mechanism for rotating the spindle including a spindle motor, a driving pulley associated therewith, a driven pulley, a high speed driving connection for the spindle, a slow speed driving connection for the spindle including reduction gearing, and control means for connecting said reduction gearing to drive the spindle, supporting axes associated with each of said driving connections on which the driven pulley is interchangeably mounted to effect the drive alternatively at the high or slow rate, and an interlocking device constructed and arranged to prevent the positioning of the driven pulley in operative position on the high speed supporting axis when the reduction gearing is connected to the spindle, and alternatively to prevent the connecting of the reduction gearing to the spindle when the driven pulley is positioned in operative position on the high speed axis.

5. In a machine tool having a rotary tool spindle, a work support, and means for effecting relative translatory movements of the spindle and work support, a variable speed driving mechanism for rotating the spindle including a driving pulley and a driven pulley, a high speed driving connection for the spindle having a supporting axis on which the driven pulley is mountable in operative relation to drive the spindle, a slow speed driving connection having a supporting axis on which the driven pulley is alternatively mountable in operative position to drive the spindle, reduction gears, and control means for shifting one of said gears to disconnect the reduction gears from the spindle, and an interlocking device comprising a rock shaft, a locking lever secured thereto movable toward and away from the high speed supporting axis between alternative positions in which said lever obstructs the movement of the driven pulley onto the high speed supporting axis, and in which the said locking lever is held away from said axis by engagement with the pulley, and a second locking lever on said shaft movable toward and away from said shiftable gear between alternative positions in which said shiftable gear is obstructed against movement from its disconnected position, and in which said second locking lever is locked in a retracted position overlying said gear when in connected position.

ARTHUR F. BENNETT.
GEORGE B. HIRSCH.